(No Model.)  3 Sheets—Sheet 1.

J. HARE & G. F. COOK.
CASH REGISTER.

No. 515,766.  Patented Mar. 6, 1894.

WITNESSES
William A. Lunt
Charles S. Brintnall

INVENTORS
John Hare
George F. Cook
by W. E. Hagan
atty (No Model.) 3 Sheets—Sheet 2.

J. HARE & G. F. COOK.
CASH REGISTER.

No. 515,766. Patented Mar. 6, 1894.

WITNESSES
William A. Livert
Charles S. Burtnall

INVENTORS
John Hare
George F. Cook
by W. E. Hagan atty

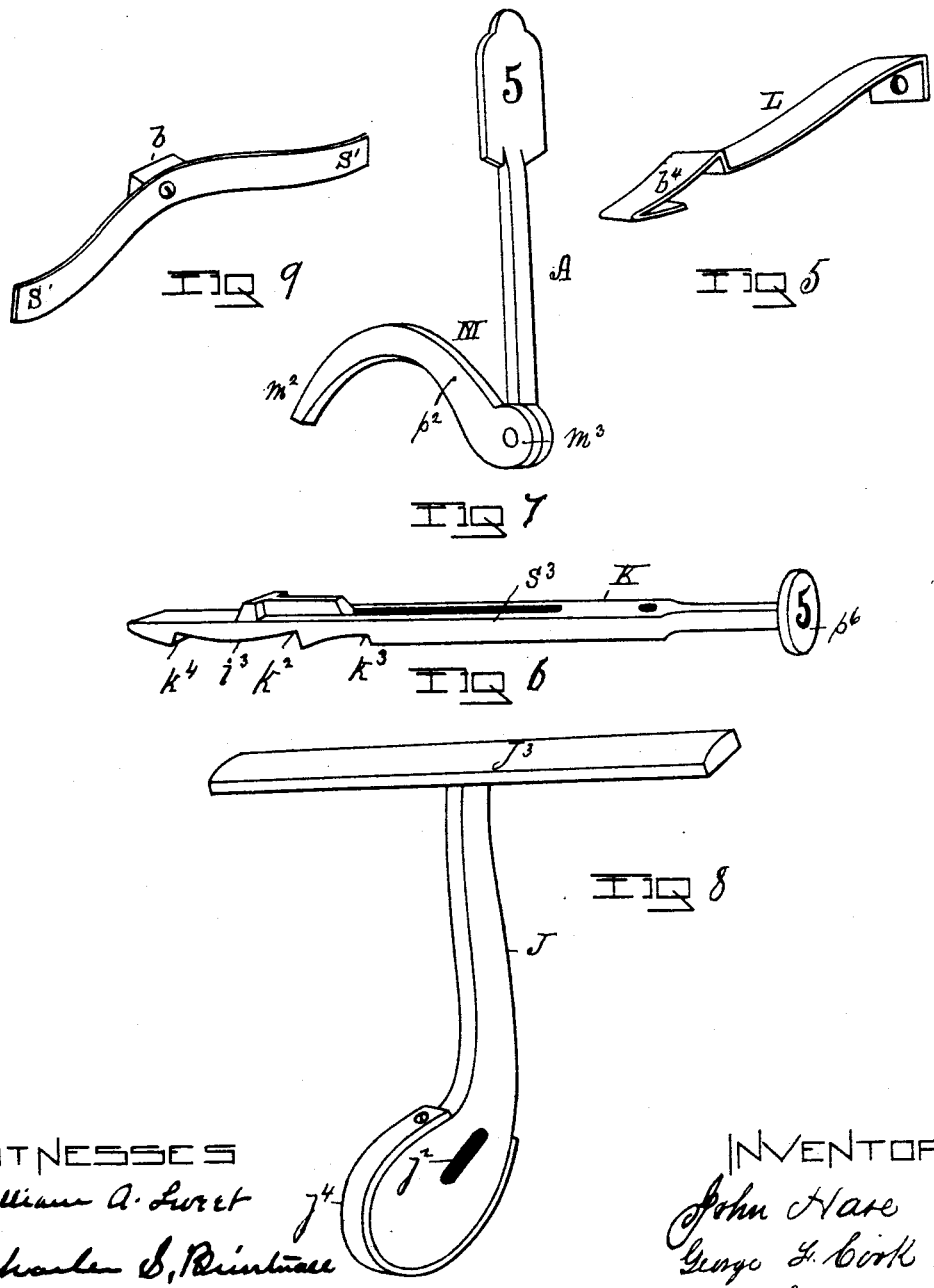

UNITED STATES PATENT OFFICE.

JOHN HARE AND GEORGE F. COOK, OF LANSINGBURG, NEW YORK.

CASH-REGISTER.

SPECIFICATION forming part of Letters Patent No. 515,766, dated March 6, 1894.

Application filed October 5, 1892. Serial No. 447,922. (No model.)

*To all whom it may concern:*

Be it known that we, JOHN HARE and GEORGE F. COOK, both of the village of Lansingburg, county of Rensselaer, and State of New York, have invented a new and useful Improvement in Cash-Registers, of which the following is a specification.

Our invention relates to that class of mechanism used to register the amount of cash sales in retail stores and other places, and the object and purpose of our invention are to simplify their construction and to reduce the cost of their production.

Accompanying this specification to form a part of it there are three sheets of drawings containing nine figures illustrating our invention, with the same designation of parts by letter reference used in all of them.

Figure 1:
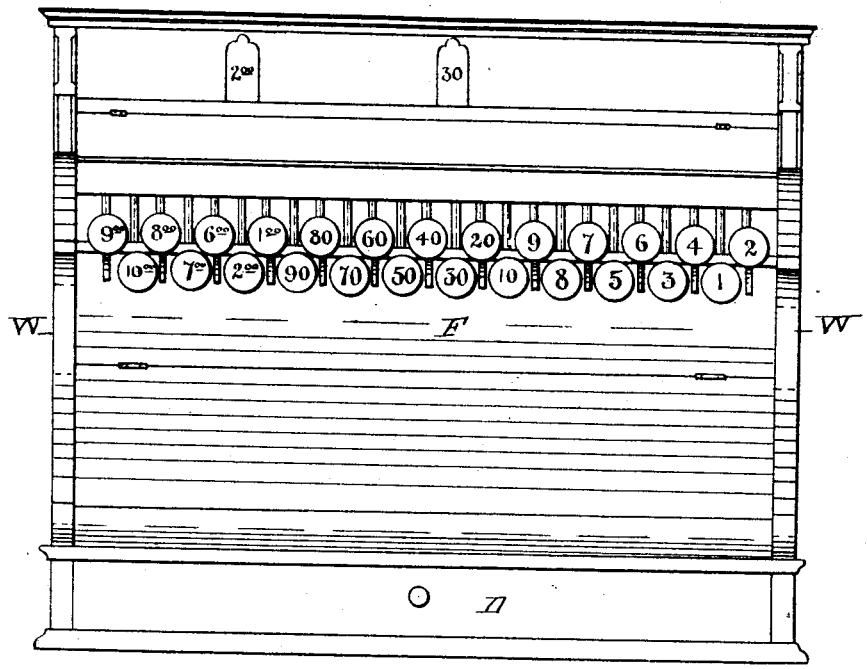
Figure 2:
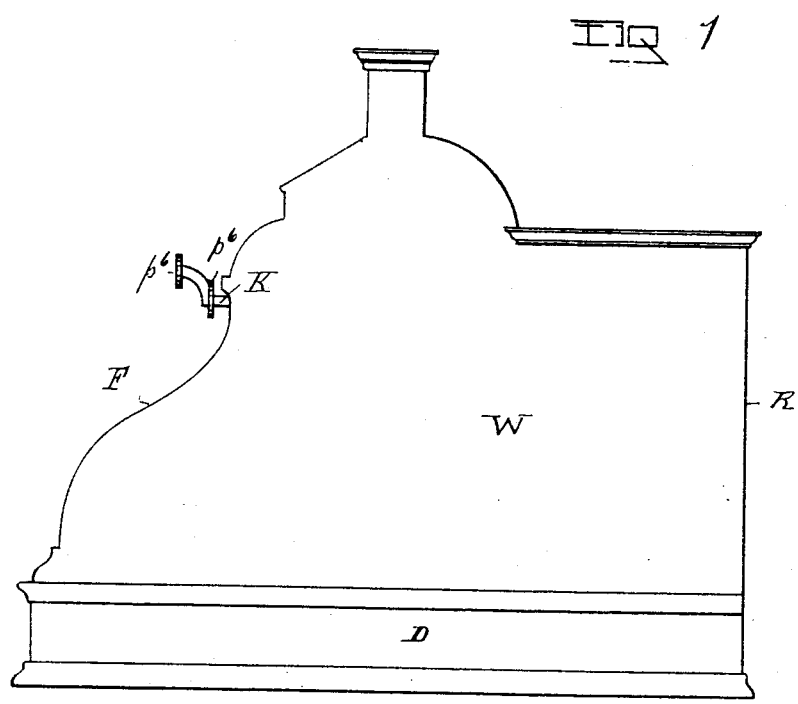
Figure 4:
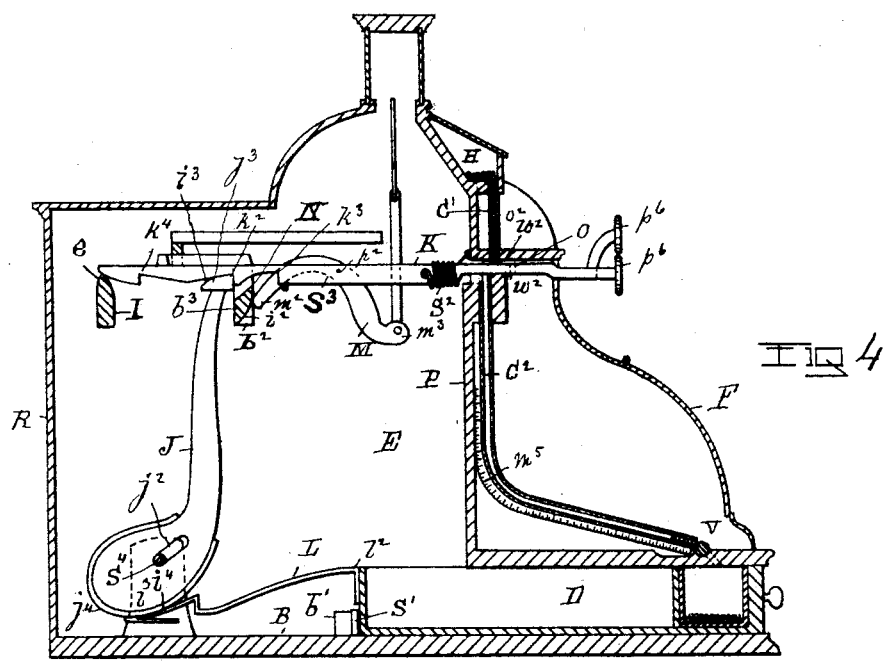
Figure 3:
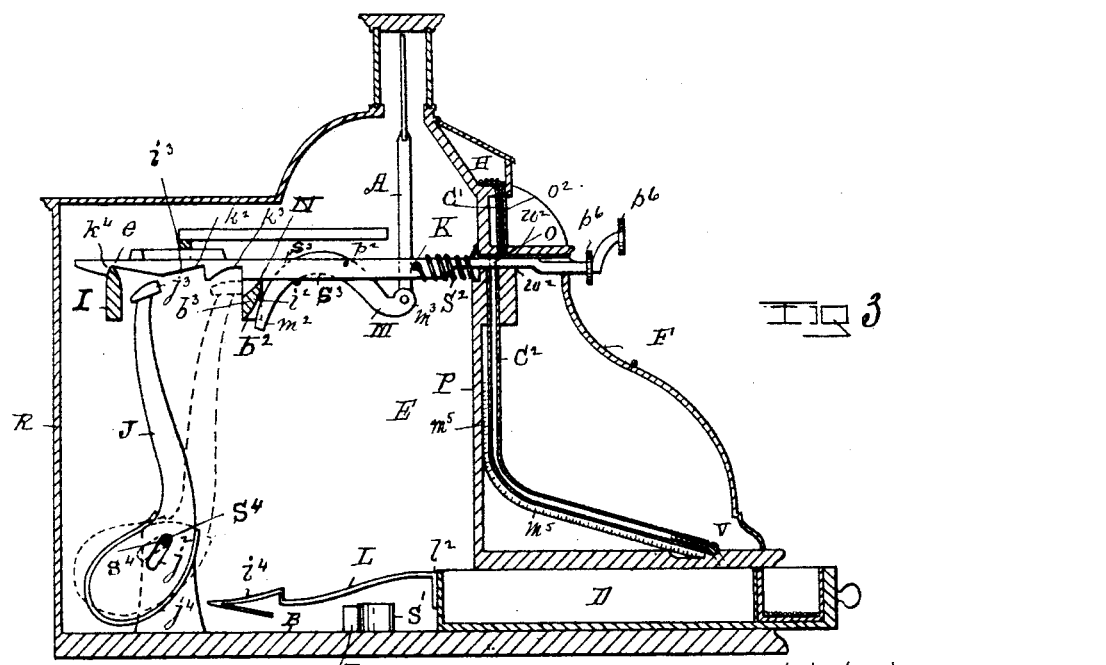

Of the illustrations Figure 1 is a front elevation of our improved cash register. Fig. 2 is an end view of the apparatus shown at Fig. 1, both ends of which are alike. Fig. 3 is a section taken from front to rear showing one of the key-bars, its arc-form lever and arm; and one of the tripping levers in side elevation; with the rest of the mechanism in section, and with the key-bar and connected parts shown as operated to indicate the amount of a sale. Fig. 4 shows the same parts in elevation and in section as illustrated at Fig. 3, but with the cash drawer closed, and the parts in position to be operated to indicate and register the amount of sale. Fig. 5 is a detached view of a latch spring, that when in position to act with the other mechanism is connected to and projected rearwardly from the rear end of the cash drawer. Fig. 6 is a perspective of one of the key-bars shown as detached from the other mechanism. Fig. 7 is a perspective of a curved lever and pivoted arm, which when in position within the machine is operated to indicate the amount of a sale. Fig. 8 is a perspective of a pivoted tripping lever, constructed to be operated by the cash drawer, and Fig. 9 is a leaf spring which when in position is secured to the bottom of the inclosure containing the mechanism and against the force of which spring, the money drawer is closed and latched.

The several parts of the mechanism thus illustrated are designated by letter reference and the function of the parts is described as follows:

The letters W designate the sides, F the front and R the rear walls of the inclosure E, in which the mechanism is located.

The letter D designates the cash drawer arranged in the bottom of the inclosure, and L a latch spring connected to the rear end of the cash drawer at $l^2$.

The letter S' designates a leaf spring that is connected to the bottom of the inclosure E by means of a block $b$, attached to the machine bottom B. When the drawer D is moved inwardly, to close, it does so against the force of this spring S', and with which the inner end of the drawer engages.

The letter P designates a vertical partition arranged within the inclosure E, and the letter I indicates a bar connected at its ends with the sides of the inclosure and extending through the latter from side to side. This bar is made with a wedge-form upper edge $e$, onto which when the key-bars K, are forced inwardly they engage by means of a latch notch $k^4$, formed on their under sides, as will be more fully described hereinafter.

The letter $b^2$ designates a bridge that at its ends connects with the sides of the inclosure and extends across the same. This bridge is made with notches or recesses N, in its upper surface, and in which notches or recesses, the key-bars are moved back and forth. Each of these notches or recesses is made with a bottom surface that is downwardly beveled as shown at $b^3$, in section, at Figs. 3 and 4, the section being taken centrally through one of the notches or recesses thus formed in the bridge $b^2$.

The key-bars K are each arranged in one of the notches or recesses N, and are therefrom extended frontwardly to pass through the partition P, and in slide-ways $w^2$ formed on the latter beneath the chutes $C^2$, and also through the front F, whereat they are each constructed with a push-button $p^6$ having a disk-face in which is placed a number, as shown at Fig. 1.

The letter $S^2$ designates a spiral spring, one end of which is attached to each of the key-bars, and the other end of the spring is connected to the partition P, as shown at Figs.

3 and 4. As thus constructed, when each of the key-bars is moved inwardly within its recess N, it is so moved against the force of the spring $S^2$. Each of these key-bars K, has latch notches $k^2$, $k^3$, $k^4$ on its under surface, so that when pushed inwardly against the force of the spring $S^2$, its latch notch $k^4$, will latch on to and engage with the wedge-form edge $e$, of the bar I. Each of the key-bars K is made with a vertical passage O, indicated by a dotted line at Figs. 3 and 4, and each of them as thus made is adapted when being pushed inwardly to have a ball $O^2$, enter the passage O, when beneath the chute $C^2$, and after thus receiving said ball, as the key-bar is moved inwardly to allow said ball to pass from the passage O in the bar into the chute $C^2$, beneath each of the key-bars when the passage on the latter comes over the top of said chute $C^2$, there being a chute $C'$ and chute $C^2$, for each of the key-bars.

The letter M designates an arc-form lever, of which there is one for each key-bar, and they are each arranged in a slot $S^3$, made in the latter. Each of these levers M, near their centers where within the slot of the key-bars are each pivoted at $p^2$, so as to oscillate thereon. The rear and down-curved end $m^2$, of each of these arc-form levers, when the key-bar with which it pivotally connects is moved rearwardly, engages with the downwardly inclined surface $i^2$, of the bridge $b^2$, and this engagement so made forces up the front end $m^3$, and the arm A pivoted thereto upon the outer surface of which there is displayed in figures the amount of the sale. When the arm M is thus moved upwardly it enters a part of the inclosure E, having a glass front through which latter the number upon the upper end of the arm A, is visible; the arm A remaining in this position until another key-bar is operated, when the one before raised is operated to descend, as will be described hereinafter.

The letter J designates a tripping lever that is made with a slotted bearing $j^2$, at its lower end, on the shaft or pin $S^4$, on which latter it may be oscillated, and raised on its bearing, and when released from its upward projection to descend by gravity. This lever J is made with a top cross-bar $j^3$, that is arranged transversely thereon so as to be at right angles to the sides of the lever, with this cross-bar having a form in cross section that will allow it to enter the notches $k^2$, on the under side of the key-bars, and engage with the incline $i^3$, thereon, when raised. This lever J has a rounded lower end $j^4$, where at the side of and below its slotted pivotal connection. The wedge-form spring L, arranged on the rear end of the drawer D, when the latter is forced inwardly, underruns the rounded lower end of the lever J, causing it to rise and to enter the notches $k^2$, on each of the key-bars, excepting that one of the latter last used, and which has been raised and latched onto the edge $e$, of the bar I, the notch $k^3$ permitting the passage of each key-bar through one of the recesses N. When a succeeding key-bar is moved inwardly, the notch $k^2$, of the bar engages with the bar $j^3$, and moves it rearwardly with the rounded surface of said bar making a cam engagement with the incline $i^3$, of the raised and latched key-bar, to raise it from off of the bar I, so as to make active the spring $S^2$, on this key-bar which draws it back into place, while the money drawer being released by the disengagement of the latch L from the lever J, is operated by the spring $S'$, to open. When the drawer D is closed, the bar $j^3$ rises as before to lock the drawer, to be again tripped as before when a succeeding key-bar is moved inwardly.

The letter H designates a hopper containing shot or balls of small diameter from which the tube-form chute $C'$ leads downwardly to where a shot or ball will be deposited in the opening O, of each of the key-bars, and which when each of the latter is moved inwardly to where it comes over the upper end of the chute $C^2$, the shot or ball will descend into the latter. There being a chute $C'$, and chute $C^2$ for each key-bar. Each of the chutes $C^2$ is provided with a valve V, to detain the shot or balls in the chute, and each of these chutes has a graduated scale $m^5$, by which the number therein may be readily determined thus, five balls or shot in the chute or tube connecting with the five-cent key-bar would be indicated on the scale and show that twenty-five cents was the aggregate of sales made in such amounts. When the tubes become filled the valve V is opened, the balls are discharged into the drawer D, and therefrom removed to the hopper.

The apparatus thus constructed and arranged is operated as follows: The drawer D being forced inwardly against the force of the spring $S'$, the latch lever L, by means of its cam-form incline $i^4$, underruns the lower rounded end of the latter, causing it to rise on its slotted bearing with its lower end engaging with the latch L at $l^3$, when the latter in moving rearward has passed the rounded end of the lever J, and which engagement holds the drawer closed against the force of the spring $S'$; while the cross-bar $j^3$, at the upper end of the lever J, as the latter rises enters the notch $k^2$, of each of the key-bars. A sale having been made, the key-bar having upon its key a figure or figures designating the amount is pushed inwardly, and as so moved first operates the arc-form lever M, to move up its arm A, on which is shown a sale amount corresponding to that of the key-board with which said arc-form lever connects. As the inward movement of the key-bar is continued, its latch notch $k^2$, in engagement with the cross-bar $j^3$, moves the upper end of the latter rearwardly so as to release it from its engagement with the drawer D, allowing the spring $S'$ to become active to force the drawer outwardly, while the key-bar thus moved by means of its latch notch $k^3$, catches on to the bar I to be there held until a succeeding key-bar is operated, and which when actuated as before (the drawer having in the mean time been closed by hand to again latch the lever J, and the bar $j^3$ of the latter having been latched into the key-bars); the inward movement of the succeeding key-bar again releases the drawer as before described and the bar $j^3$, as moved rearwardly raises the preceding key-bar from off the bar I, to be returned to a normal position by means of its spring $S^2$, and to draw down its arm A. When each key-bar is operated a ball from the chute C' enters the opening O, in the key-bar and is carried therein rearwardly until the opening O is over the chute $C^2$, when the ball descends into the latter, to be detained therein by the valve V and by the scale on said chute indicates the number of sales of the amount for which the key-bar of such chute is graduated, as before described, and when the chutes or tubes $C^2$, become full of balls, or when their amount is determined by an examination of the graduated scale on the chutes $C^2$, the valve V, is opened and the balls descend into the front part of the drawer D as shown at Figs. 3, and 4.

Having thus described our invention, what we claim, and desire to secure by Letters Patent, is—

1. In a cash register the combination with a sales indicating key-bar constructed to be moved horizontally, of a bridge and slide passages for said key-bar; an arc-formed lever that at or near its center is pivoted to said key-bar, and having at its front end an arm upcast therefrom and pivoted thereto, said arm indicating upon its upper end the same sale amount as the key-bar, with the rear end of said arc-form lever, as moved rearwardly by the key-bar, constructed to engage with said bridge to force upwardly its front end and the arm pivoted thereto, substantially in the manner as and for the purposes set forth.

2. In a cash register the combination with a cash drawer, made with a latch spring horizontally projected from its rear end, of a spring located in the bottom of the cash register interior against the recoil force of which the drawer is closed; a vertically arranged tripping lever having its lower end rounded off and made thereat with a slotted pivotal connection on which to oscillate and be moved upwardly by the drawer latch spring when the drawer is pushed in to close; a top cross-bar arranged on the top of said tripping lever; and key-bars each made with a latch notch and with cam surface constructed to engage with said top-cross-bar, substantially in the manner as and for the purposes set forth.

3. In a cash register the combination of a bank of key-bars arranged to be separately moved horizontally in a slide-way and against the recoil force of a spring, and each made with a latching notch, a cam surface and tripping cross-bar notch on their under sides; a bridge made with recesses for the passage of said key-bars, said recesses having downwardly and rearwardly beveled bottom surfaces; a horizontal bar made with a wedge-form upper edge onto which each of the key-bars is constructed to latch when moved rearwardly; and a tripping lever having a top cross-bar constructed to engage with the cam or inclined surface of a latched key-bar and to raise the same from off its latched engagement with the wedge-form edge of the horizontal bar, substantially in the manner as and for the purposes set forth.

4. In a cash registering mechanism, the combination with key-bars K, each made with the notches $k^2$, $k^3$, and incline $i^3$, and provided with slide-ways $w^2$, in which to be moved horizontally against the force of an encircling spring, of the bar I made with a wedge-form upper edge; the drawer D made with the latch spring L; the tripping lever J, made with a slotted pivotal connection at its lower end, and the top cross-bar $j^3$, at its upper end; and the spring S', placed back of the drawer, constructed and arranged to be operated substantially in the manner as and for the purposes set forth.

5. In a cash registering mechanism, the combination with keys-bars K, each made with the notches $k^2$, $k^3$, and incline $i^3$, and provided with slide-ways $w^2$, in which to be moved horizontally against the force of an encircling spring; of the bar I, made with a wedge-form upper edge; the bridge $b^2$, made with the recesses N; the drawer D, made with the latch-spring L; the tripping lever J, having a slotted pivotal connection at its lower end and the top cross-bar $j^3$, at its upper end; the spring S' placed back of said drawer, substantially in the manner as and for the purposes set forth.

Signed at Troy, New York, this 21st day of June, 1892, and in the presence of the two witnesses whose names are hereto written.

JOHN HARE.
GEORGE F. COOK.

Witnesses:
W. E. HAGAN,
CHARLES S. BRINTNALL.